Patented Apr. 11, 1939

2,153,842

UNITED STATES PATENT OFFICE 2,153,842

PAINT COMPOSITION

Lindley E. Mills, Midland, Mich., assignor to The Dow Chemical Company, Midland, Mich., a corporation of Michigan No Drawing. Application October 7, 1937, Serial No. 167,700

7 Claims. (Cl. 134—39)

This invention concerns the preservation of oil-base paints and varnishes, and is particularly concerned with the protection of coating films thereof from the decomposition and staining caused by fungous growths.

Oil-base paints and varnishes are subject to attack by various fungous and bacterial organisms following application to exposed surfaces, and particularly under conditions of high humidity. Such attack results in the eventual failure of the paint or varnish film. In some cases the oily base is consumed by the organism, while in other cases the hydrogen ion concentration of the film is sufficiently changed due to the presence of metabolic by-products of the attacking organism to cause fading and change in chemical composition of the paint pigment. Perhaps the most common difficulty arising from the attack of paints and varnishes by various micro-organisms, and particularly molds, is the discoloration of painted surfaces by accumulations of mycelia and spores thereon. Aside from this disfiguration of the paint surface, spores and mycelia frequently work under the paint film through abrasions and cracks therein, causing the dried film to scale, and in the case of wooden surfaces accelerating the rotting and deterioration of the structure underneath. In dairies, packing houses, etc., the prolific growth of fungi and bacteria upon painted surfaces gives rise to obnoxious and musty odors of sufficient intensity to taint milk, butter, and similar food products processed in proximity thereto.

A number of fungicidal agents have been suggested for inclusion in oil-base paints and varnishes to prevent mold growth. Certain of the agents heretofore employed react with oils and pigments and accelerate discoloration and fading thereof. The fungicidal effect produced by many of the commoner preservatives is transitory, since they vaporize, sublime, or are otherwise dissipated out of the composition upon weathering. Certain preservatives, such as the mercurials and compounds containing fluorine are objectionable because of their high toxicity to humans. Other fungicidal compounds are decomposed by light and air, causing premature discoloration of the paint or varnish supposedly protected therewith.

Among the objects of this invention is to provide a method for the preservation of oil-base paints and varnishes which will (1) give relatively permanent protection for films thereof against fungous and bacterial attack and decomposition, and (2) serve as means for protecting the wood directly beneath the paint or varnish film from deterioration. A further object is to provide a composition consisting of an oil-base paint or varnish having a preservative material dissolved or otherwise dispersed therein, which prevents the growth of spores or mycelia of air-borne organisms. A further object is to provide a preservative adapted to be incorporated into oil-base paints and varnishes which (1) will be substantially non-toxic to humans, (2) will exercise a permanent preserving effect upon such coating composition, (3) will not itself undergo excessive discoloration upon exposure to light, (4) will not accelerate the discoloration of paint pigment upon weather, and (5) will be sufficiently soluble in the oils employed in paint or varnish compositions that it may be incorporated therein prior to manufacture of the composition, and thereafter stored without the separation of the preservative by precipitation, crystallization, or otherwise.

I have discovered that those polychloro phenols containing 3 or 4 chlorine atoms attached to the benzene ring can be employed advantageously in paint and varnish compositions to prevent fungous and bacterial attack of films thereof. 2,4,6-trichloro phenol, 2,4,5-trichloro phenol, and 2,4,5,6-tetrachloro phenol, are particularly well adapted for this use. These compounds can be incorporated with oil-base coating compositions in amounts up to 5 per cent by weight thereof without causing such compositions to undergo excessive discoloration or fading upon weathering, increasing their sensitivity to light, or causing films of such compositions to become toxic to humans. The tri- or tetrachloro phenol can be dissolved in the oil-base or ground with the pigment prior to or during the formulation of the coating composition, or may be dissolved therein immediately prior to application.

The amount of tri- or tetrachloro phenol required to exert a fungicidal action in paint and varnish preparations is dependent upon the temperature and humidity to which films thereof are to be exposed. While amounts of preservatives ranging between about 0.1 and 5.0 per cent by weight can be incorporated advantageously with various coating compositions, I have found that from about 1 to about 2.5 per cent by weight is generally sufficient to prevent mold growth on and in the applied film and to inhibit the attack by mold or termites of wood surfaces coated therewith.

Among the common organisms which attack films or oil-base coating compositions, and against which the tri- and tetrachloro phenols have been found effective, are *Aspergillus niger*, *Aspergillus flavus*, *Aspergillus fumigatus*, *Penicillium glaucum*, *Penicillium italicum*, *Fomes anosus*, *Ceratostomella pilifera*, mixtures of fermentation and putrefaction bacteria, etc.

The tri- and tetrachloro phenols are satisfactory for use in any coating composition comprising oily constituents capable of dissolving from 1 to 2 per cent by weight thereof. These compounds are relatively soluble in most oily materials over a wide range of temperature; for example, 50 per cent by weight solutions of 2,4,5-trichloro phenol and 2,4,5,6-tetrachloro phenol in linseed oil do not deposit crystals or show separation when cooled to temperatures as low as 10° C.

Among the coating compositions which can be satisfactorily protected against fungous attack by relatively small amounts of tri- and tetrachloro phenol are those commonly termed dammar and alkyd resin, phenol resinate, resin oil, short oil mill white, long oil, short oil, slow drying oil, hard enamel, interior enamel, flat paint, and gloss paint types and varnish compositions containing oils, gums and resins of animal and vegetable origin. The use of these preservatives is particularly advantageous in highly colored barn and house paints, where fungous attack results in a rapid fading and decoloration of dried films thereof. The following formulae are representative of compositions resistant to fungous attack:

Composition 1

| | Parts by weight |
|---|---|
| Carbonate white lead | 43.4 |
| Zinc oxide | 21.7 |
| Raw linseed oil | 28.5 |
| Turpentine | 3.2 |
| Japan drier | 3.2 |
| 2,4,5-trichloro phenol | 2.0 |

Composition 2

| | | |
|---|---|---|
| White lead paste (8% oil) | pounds | 100 |
| Raw linseed oil | gallons | 4 |
| Turpentine | gallon | 0.12 |
| Drier | do | 0.12 |
| 2,4,6-trichloro phenol | pounds | 3.3 |

Composition 3

| | Parts by weight |
|---|---|
| Pigment | 65 |
|    White lead, zinc oxide, Titanox, inert silicates. | |
| Tung oil | 31.5 |
| Turpentine and drier | 3.5 |
| 2,4,5,6-tetrachloro phenol | 1.5 |

Composition 4

| | Parts by weight |
|---|---|
| Grinders dark chrome green | 12 |
| Siliceous inerts | 48 |
| Raw linseed oil | 36 |
| Turpentine and drier | 4 |
| 2,4,5-trichloro phenol | 2.5 |

Composition 5

| | Parts by weight |
|---|---|
| Natural mineral brown oxide | 60 |
| Raw linseed oil | 36 |
| Turpentine and drier | 4 |
| 2,4,5,6-tetrachloro phenol | 1.25 |

Composition 6

| | | |
|---|---|---|
| Basic carbonate white lead paste (8% oil) | pounds | 100 |
| Raw linseed oil | gallons | 1.5 |
| Soy bean oil | do | 2.5 |
| Turpentine and drier | gallon | 0.25 |
| 2,4,5-trichloro phenol | pounds | 3.75 |

Other modes of applying the principle of my invention may be employed instead of those explained, change being made as regards the materials or their amounts employed, provided the compositions stated by any of the following claims or their equivalent be employed.

I therefore particularly point out and distinctly claim as my invention:

1. A coating composition comprising a drying oil as the major vehicle and a halo-phenol having from 3 to 4 chlorine atoms, inclusive, attached to the benzene ring thereof in amount sufficient to serve as a fungicide and preservative.

2. A coating composition comprising a drying oil as the major vehicle and from about 1 to 2.5 per cent by weight of a compound selected from the group consisting of 2,4,6-trichlorophenol, 2,4,5-trichlorophenol, and 2,4,5,6-tetrachlorophenol.

3. A coating composition comprising a drying oil as the major vehicle and from about 1.0 to 2.5 per cent by weight of 2,4,5-trichlorophenol.

4. A paint comprising a drying oil as the major vehicle and 2,4,5-trichlorophenol in amount sufficient to serve as a fungicide and preservative.

5. A paint comprising a drying oil as the major vehicle and 2,4,6-trichlorophenol in amount sufficient to serve as a fungicide and preservative.

6. A paint comprising a drying oil as the major vehicle and 2,4,5,6-tetrachlorophenol in amount sufficient to serve as a fungicide and preservative.

7. A paint comprising a drying oil as the major vehicle and a halo-phenol having from 3 to 4 chlorine atoms, inclusive, attached to the benzene ring thereof in amount sufficient to serve as a fungicide and preservative.

LINDLEY E. MILLS.